United States Patent
Rider et al.

(10) Patent No.: US 10,752,725 B2
(45) Date of Patent: *Aug. 25, 2020

(54) RIGID POLYURETHANE FOAMS SUITABLE FOR USE AS PANEL INSULATION

(71) Applicant: Covestro LLC, Pittsburgh, PA (US)

(72) Inventors: Shawn G. Rider, Harrisville, PA (US); David F. Sounik, Bethel Park, PA (US)

(73) Assignee: Covestro LLC, Pittsburgh, PA (US)

( * ) Notice: Subject to any disclaimer, the term of this patent is extended or adjusted under 35 U.S.C. 154(b) by 277 days.

This patent is subject to a terminal disclaimer.

(21) Appl. No.: 15/961,270

(22) Filed: Apr. 24, 2018

(65) Prior Publication Data

US 2019/0322790 A1    Oct. 24, 2019

(51) Int. Cl.
| | | |
|---|---|---|
| C08G 18/20 | (2006.01) | |
| C08G 18/48 | (2006.01) | |
| C08J 9/14 | (2006.01) | |
| C08G 18/42 | (2006.01) | |
| C08J 9/00 | (2006.01) | |
| C08G 18/76 | (2006.01) | |
| B32B 5/24 | (2006.01) | |
| C08G 101/00 | (2006.01) | |

(52) U.S. Cl.
CPC .......... C08G 18/2018 (2013.01); B32B 5/245 (2013.01); C08G 18/2027 (2013.01); C08G 18/4244 (2013.01); C08G 18/4829 (2013.01); C08G 18/4879 (2013.01); C08G 18/4883 (2013.01); C08G 18/7671 (2013.01); C08J 9/0038 (2013.01); C08J 9/144 (2013.01); B32B 2250/03 (2013.01); B32B 2262/101 (2013.01); B32B 2266/0278 (2013.01); B32B 2305/022 (2013.01); B32B 2307/304 (2013.01); B32B 2323/10 (2013.01); B32B 2367/00 (2013.01); C08G 2101/0025 (2013.01); C08J 2205/10 (2013.01); C08J 2375/08 (2013.01)

(58) Field of Classification Search
CPC ............ C08G 18/2018; C08G 18/2027; C08G 18/4244; C08G 18/4816; C08G 18/4825; C08G 18/4829; C08G 18/4879; C08G 18/4883; C08G 18/7664; C08G 18/7671; C08G 2101/0025; C08J 9/0038; C08J 9/144; C08J 2205/10; C08J 2375/08; B32B 5/245; B32B 2250/03; B32B 2262/101; B32B 2266/0278; B32B 2305/022; B32B 2307/304; B32B 2323/10; B32B 2367/00

See application file for complete search history.

(56) References Cited

U.S. PATENT DOCUMENTS

| | | |
|---|---|---|
| 5,690,855 A | 11/1997 | Nichols et al. |
| 5,880,168 A * | 3/1999 | Heinz ................. C08G 18/482 521/174 |
| 9,051,442 B2 | 6/2015 | Williams et al. |
| 9,453,115 B2 | 9/2016 | Williams et al. |
| 9,550,854 B2 | 1/2017 | Van Der Puy et al. |
| 9,556,303 B2 | 1/2017 | Ross et al. |
| 2007/0173556 A1 | 7/2007 | Prange et al. |
| 2010/0116829 A1 | 5/2010 | Van Der Wal et al. |
| 2012/0172476 A1 | 7/2012 | Costa et al. |
| 2012/0202904 A1 | 8/2012 | Chen et al. |
| 2013/0041048 A1 | 2/2013 | Chen et al. |
| 2014/0005288 A1 | 1/2014 | Chen et al. |
| 2014/0051776 A1 | 2/2014 | Chen et al. |
| 2014/0151593 A1 | 6/2014 | Yin et al. |
| 2014/0371338 A1 | 12/2014 | Chen et al. |
| 2015/0065592 A1 | 3/2015 | Girotti |
| 2016/0130416 A1 | 5/2016 | Chen et al. |
| 2016/0145374 A1 * | 5/2016 | Ishikawa ............ C08G 18/1808 521/129 |
| 2017/0081491 A1 | 3/2017 | Chen et al. |
| 2017/0158801 A1 | 6/2017 | Rider et al. |
| 2018/0051121 A1 | 2/2018 | Micheletti et al. |
| 2019/0177465 A1 | 6/2019 | Chen et al. |

OTHER PUBLICATIONS

Dr. L. Abele et al, Manufacturing of Rigid Polyurethane Foams, Polyurethane Handbook, 1993, pp. 253-256, 2nd Edition, Hanser Publishers; Hanser/Gardner Publications, Inc, Munich; Vienna; New York: Hansar; Cincinnati: Hansen/Gardner.

Steven L. Schilling, Polyurethane Foams Co-Blown With a Mixture of a Hydrocarbon and a Halogenated Olefin, COV162016 MD-15-027/-16-017, U.S. Appl. No. 15/354,069, filed Nov. 17, 2016, pp. 1-49, Not published at this time.

* cited by examiner

*Primary Examiner* — John M Cooney

(74) *Attorney, Agent, or Firm* — Donald R. Palladino

(57) ABSTRACT

Disclosed are polyurethane-foam forming compositions, rigid polyurethane foams and methods for their production, as well as to composite articles comprising such foams sandwiched between facer substrates, including use of such composite elements for floor insulating elements for refrigerated tractor trailers. The rigid polyurethane foams are produced from an isocyanate-reactive component comprising: (1) a polyol blend; (2) a halogenated hydroolefin; (3) a surfactant; (4) water; and (5) a tertiary amine catalyst composition.

19 Claims, No Drawings

RIGID POLYURETHANE FOAMS SUITABLE FOR USE AS PANEL INSULATION

TECHNICAL FIELD

This specification pertains generally to rigid polyurethane foam-forming compositions, rigid polyurethane foams, and methods for their production, as well as to composite articles comprising such foams sandwiched between facer substrates, including use of such composite elements for floor insulating elements for refrigerated tractor trailers. The rigid polyurethane foams are produced from an isocyanate-reactive component comprising: (1) a polyol blend; (2) a halogenated hydroolefin; (3) a surfactant; (4) water; and (5) a tertiary amine catalyst composition.

BACKGROUND

Rigid polyurethane foams are used in numerous industries. They are produced by reacting an appropriate polyisocyanate and an isocyanate-reactive compound, usually a polyol, in the presence of a blowing agent. One use of such foams is as a thermal insulation medium in the construction of refrigerated storage devices. The thermal insulating properties of closed-cell rigid foams are dependent upon a number of factors, including the average cell size and the thermal conductivity of the contents of the cells. Chlorofluorocarbons (CFC's) were typically used as blowing agents to produce these foams because of their exceptionally low vapor thermal conductivity. However, CFC's are now known to contribute to the depletion of ozone in the stratosphere and, as a result, mandates have been issued which prohibit their use.

Initially, the most promising alternatives to CFC's appeared to be hydrogen-containing chlorofluorocarbons (HCFC's). While HCFC's, such as HCFC 141b, have been used as alternatives to CFC's, they have also been found to have some ozone-depletion potential. There is, therefore, a desire to find substitutes for HCFC's as well as CFC's.

Alternative blowing agents, such as hydrofluorocarbons (HFC's), also replaced CFC's. The compounds are, however, greenhouse gases. Hydrocarbons, such as pentane isomers, have also been used but these are flammable and have lower energy efficiency. Halogenated hydroolefinic compounds, such as hydrofluoropropenes and/or hydrochlorofluoropropenes, are possible candidates as replacements for HFCs, since their chemical instability in the lower atmosphere provides for a low global warming potential and zero or near zero ozone depletion properties.

A drawback to some of these materials as blowing agents in the production of satisfactory isocyanate-based foams, however, is shelf-life issues. Blowing agents usually are combined with polyols and other components, such as surfactant(s) and catalyst(s) to form a so-called "B-side" pre-mix that may be stored for up to several months prior to being combined with an "A-side" isocyanate component to form the foam. A drawback of systems that use certain hydrohaloolefins is the shelf-life of the B-side composition. If the B-side composition is aged prior to combining with the polyisocyanate, the foam can be of lower quality and may even collapse during the formation of foam. The poor foam structure is thought to be attributable to the reaction of certain catalysts with these hydrohaloolefins which results in the partial decomposition of the blowing agent and, as a result, undesirable modification of silicone surfactants, resulting in poor foam structure and quality.

Foam-forming compositions used in the production of discontinuous panel insulation, such as insulation for refrigerated trailer floors, must exhibit a stringent combination of properties. For example, in addition to good thermal insulation properties, they must exhibit a target gel time conducive to the manufacturing equipment and process that is used, and they must exhibit a long shelf life, which means that this gel time cannot change by a large amount after storage of the foam-forming composition components for a long period of time (several months or more), even when water is used as a blowing agent component in an amount of 2% by weight or more, based on the total weight of the isocyanate-reactive component. They also must exhibit good dimensional stability (low foam shrinkage) even when the free-rise foams have a relatively low density of 1.4 to 1.7 lb/ft$^3$. In addition, it is important that the foam adheres well to facer substrates typically used in refrigerated trailer floor applications. Moreover, since the trailer floor part is often foamed without a press, it can be important that the foam doesn't generate high pressure during foaming. A composition that can fulfill most, if not all, of these requirements, while utilizing a halogenated hydroolefin blowing agent would, therefore, before highly desirable.

SUMMARY

In certain respects, the present disclosure is directed to a rigid foam-forming composition. These compositions comprise: (a) a diisocyanate and/or polyisocyanate; and (b) an isocyanate-reactive component. The isocyanate-reactive component comprises: (1) a polyol blend; (2) a halogenated olefin; (3) a surfactant; (4) water; and (5) a tertiary amine catalyst composition. The polyol blend comprises: (i) 60 to 98% by weight, based on the total weight of the polyol blend, of a saccharide-initiated polyether polyol having an OH number of from 200 to 600 mg KOH/g and a functionality of 4 to 6; (ii) 1 to 20% by weight, based on the total weight of the polyol blend, of an aliphatic triol-initiated polyether polyol having an OH number of 100 to 500 mg KOH/g and a functionality of from greater than 2 to 4; and (iii) 1 to 20% by weight, based on the total weight of the polyol blend, of a polyalkylene oxide glycol having a functionality of 1.9 to 2.0 and an OH number of from 40 to 225 mg KOH/g. The tertiary amine catalyst composition comprises (i) 80 to 99% by weight, based on the total weight of the tertiary amine catalyst composition, of a morpholine; and (ii) 1 to 20% by weight, based on the total weight of the tertiary amine catalyst composition, of an imidazole.

The present specification is also directed to rigid polyurethane foams produced from such compositions, isocyanate-reactive compositions for making such rigid foams, methods for making such rigid foams, composite articles comprising such rigid foams, and refrigerated trailers that include such a composite element as floor insulation.

DETAILED DESCRIPTION

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As used herein, the term "functionality" refers to the average number of reactive hydroxyl groups, —OH, present per molecule of the polyol or polyol blend that is being described. In the production of polyurethane foams, the hydroxyl groups react with isocyanate groups, —NCO, that are attached to the isocyanate compound. The term "hydroxyl number" refers to the number of reactive hydroxyl groups available for reaction, and is expressed as the number of milligrams of potassium hydroxide equivalent to the hydroxyl content of one gram of the polyol (ASTM D4274-16). The term "equivalent weight" refers to the weight of a compound divided by its valence. For a polyol, the equivalent weight is the weight of the polyol that will combine with an isocyanate group, and may be calculated by dividing the molecular weight of the polyol by its functionality. The equivalent weight of a polyol may also be calculated by dividing 56,100 by the hydroxyl number of the polyol–Equivalent Weight (g/eq)=(56.1×1000)/OH number.

As indicated, certain embodiments of the present specification are directed to rigid foams. A rigid foam is characterized as having a ratio of compressive strength to tensile strength of at least 0.5:1, elongation of less than 10%, as well as a low recovery rate from distortion and a low elastic limit, as described in in "Polyurethanes: Chemistry and Technology, Part II Technology," J. H. Saunders & K. C. Frisch, Interscience Publishers, 1964, page 239.

The rigid polyurethane-foam forming compositions of the present specification comprise the reaction product of: (a) a diisocyanate and/or polyisocyanate; and (b) an isocyanate-reactive component.

Any of the known organic isocyanates, modified isocyanates or isocyanate-terminated prepolymers made from any of the known organic isocyanates may be used. Suitable organic isocyanates include aromatic, aliphatic, and cycloaliphatic polyisocyanates and combinations thereof. Useful isocyanates include: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclo-hexane diisocyanate, isomers of hexahydro-toluene diisocyanate, isophorone diisocyanate, dicyclo-hexylmethane diisocyanates, 1,5-naphthylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyl-diphenyl-propane-4,4'-diisocyanate; triisocyanates such as 2,4,6-toluene triisocyanate; and polyisocyanates such as 4,4'-dimethyl-diphenylmethane-2,2',5,5'-tetraisocyanate and the polymethylene polyphenyl-polyisocyanates.

Undistilled or crude polyisocyanates may also be used. The crude toluene diisocyanate obtained by phosgenating a mixture of toluene diamines and the crude diphenylmethane diisocyanate obtained by phosgenating crude diphenylmethanediamine (polymeric MDI) are examples of suitable crude polyisocyanates. Suitable undistilled or crude polyisocyanates are disclosed in U.S. Pat. No. 3,215,652.

Modified isocyanates are obtained by chemical reaction of diisocyanates and/or polyisocyanates. Useful modified isocyanates include, but are not limited to, those containing ester groups, urea groups, biuret groups, allophanate groups, carbodiimide groups, isocyanurate groups, uretdione groups and/or urethane groups. Examples of modified isocyanates include prepolymers containing NCO groups and having an NCO content of from 25 to 35 weight percent, such as from 29 to 34 weight percent, such as those based on polyether polyols or polyester polyols and diphenylmethane diisocyanate.

In certain embodiments, the polyisocyanate comprises a methylene-bridged polyphenyl polyisocyanate and/or a prepolymer of methylene-bridged polyphenyl polyisocyanates having an average functionality of from 1.8 to 3.5, such as from 2.0 to 3.1, isocyanate moieties per molecule and an NCO content of from 25 to 32 weight percent, due to their ability to cross-link the polyurethane.

The isocyanate-reactive component described in this specification comprises a polyol blend. More particularly, in certain embodiments, the polyol blend comprises a saccharide initiated polyether polyol. As used herein, "saccharide initiated polyether polyol" refers to a polyether polyol prepared by reacting at least one alkylene oxide with one or more suitable starter compounds in the presence of a suitable catalyst, in which the starter compounds comprise one or more saccharide initiators. Examples of suitable alkylene oxides include ethylene oxide, propylene oxide, butylene oxide, styrene oxide, epichlorohydrin, or mixtures thereof, etc. Some examples of suitable saccharide initiators are sucrose, sorbitol, maltitol, etc. as well as other mono-saccharides, di-saccharides, tri-saccharides and polysaccharides which are known to those of ordinary skill in the art. Other initiator compounds are often used in combination with the saccharide initiator to prepare the saccharide initiated polyether polyol. Saccharides can be co-initiated with for example, compounds such as water, propylene glycol, glycerin, ethylene glycol, ethanol amines, diethylene glycol, etc. and mixtures thereof, to form the polyether polyols (a). As will be appreciated, it is possible to use a wide variety of individual initiator compounds in combination with one another in which the functionality of the individual initiator compounds does not fall within the functionalities set forth herein, provided that the average functionality of the mixture of initiator compounds satisfies the overall functionality range disclosed herein.

Some examples of suitable catalysts which can be used include basic catalysts (such as sodium or potassium hydroxide or tertiary amines such as methyl imidazole), double metal cyanide (DMC) catalysts, etc.

In some embodiments, the saccharide initiated polyether polyol has an OH number of from 200 to 600 mg KOH/g, such as 300 to 550 mg KOH/g, such as 350 to 450 mg KOH/g, or, in some cases, 398 to 422 mg KOH/g, and a functionality of 4 to 6, such as 4 to 5, 4.0 to 4.5, or 4.2 to 4.3.

In some embodiments, the saccharide-initiated polyether polyol is utilized in an amount of 60 to 98% by weight, 60 to 90% by weight, such as 70 to 90% by weight, or 70 to 80% by weight, based on the total weight of the polyol blend.

As indicated earlier, in embodiments, the polyol blend further comprises an aliphatic triol-initiated polyether polyol having an OH number of 100 to 500 mg KOH/g, such as 200 to 400 mg KOH/g, 200 to 300 mg KOH/g, 200 to 250 mg KOH/g, 230 to 250 mg KOH/g or 233 to 243 mg KOH/g, and a functionality of from greater than 2 to 4, such as 2.5 to 3.5, or, in some cases, 3.0.

Such polyether polyols can be prepared by reacting suitable aliphatic divalent, trivalent and/or more valent alcohols, (e.g., ethanediol, propanediol-1,2 and propanediol-1,3, diethylene glycol, dipropylene glycol, butanediol-1,4, hexanediol-1,6, and glycerin), provided that at least one trivalent alcohol is used. In some embodiments, the polyvalent alcohol starter comprises or, in some cases, consists of glycerin and the alkylene oxide comprises, or, in some cases, consists of propylene oxide.

In certain embodiments, the aliphatic triol-initiated polyether polyol is utilized in an amount of 1 to 20% by weight, such as 5 to 20% by weight, or 10 to 20% by weight, based on the total weight of the polyol blend.

In certain embodiments, the saccharide-initiated polyether polyol and the aliphatic triol-initiated polyether polyol are present in the polyol blend in a weight ratio of at least 3:1, such as 3:1 to 30:1, 3:1 to 20:1, or, in some cases 3:1 to 15:1, 3:1 to 10:1, or, in some cases, 4:1 to 6:1.

As indicated earlier, in embodiments, the polyol blend further comprises a polyalkylene oxide glycol having a functionality of 1.9 to 2.0, such as 1.98 to 2.00, and an OH number of from 40 to 225 mg KOH/g, such as 56 to 112 mg KOH/g, and a number average molecular weight of 500 to 5000 g/mol, such as 1000 to 2000 g/mol.

Suitable polyalkylene oxide glycols include products obtained by addition polymerization of one or more alkylene oxides such as ethylene oxide, propylene oxide, butylene oxide and the like to one or more glycols, such as ethylene glycol, diethylene glycol and other oligomers of ethylene glycol and/or propylene glycol. In some embodiments, the alkylene oxide comprises, or in some cases, consists of, propylene oxide and/or the glycol comprises, or, in some cases, consists of, propylene glycol.

In some embodiments, the polyalkylene, such as polypropylene, oxide glycols are produced from using a double metal cyanide catalyst (DMC catalyst) instead of the conventional potassium hydroxide, and consequently exhibit a greater OH-functionality and lower monool content than those which have been produced in conventional manner using potassium hydroxide as catalyst.

Such polyether polyols can be produced by polymerizing propylene oxide in the presence of a DMC catalyst, such as zinc hexacyano-cobaltate, at 130° C., for example, using the process described in WO 97/29,146 (Examples 1 to 5) with incremental addition of starter. Continuous starters which are suitable include water or low molecular weight polyols having a molecular weight of less than 300 g/mol, such as glycerol, propylene glycol, dipropylene glycol, ethylene glycol, trimethylolpropane and sorbitol.

In some embodiments, the foregoing polyalkylene oxide glycol is utilized in an amount of 1 to 20%, such as 10 to 15% by weight, based upon the total weight of the polyol blend.

In certain embodiments, the saccharide-initiated polyether polyol and the polyalkylene oxide glycol are present in the polyol blend in a weight ratio of at least 2:1, such as 3:1 to 30:1, 3:1 to 20:1, or, in some cases 3:1 to 10:1, 4:1 to 8:1, or, in some cases, 5:1 to 7:1. In certain embodiments, the aliphatic triol-initiated polyether polyol and the polyalkylene oxide glycol are present in the polyol blend in a weight ratio of at least 0.3:1, such as 0.3:1 to 3.0:1, 0.5:1 to 2.0:1, or, in some cases 0.5:1 to 1.5:1, 1.0:1 to 1.5:1, or, in some cases, 1.0:1 to 1.2:1.

If desired, the polyol blend may include additional compounds that contain isocyanate-reactive groups, such as chain extenders and/or crosslinking agents, and higher molecular weight polyether polyols and polyester polyols not described above. Chain extenders and/or crosslinking agents include, for example, ethylene glycol, propylene glycol, butylene glycol, glycerol, diethylene glycol, dipropylene glycol, dibutylene glycol, trimethylolpropane, pentaerythritol, ethylene diamine, diethyltoluenediamine, etc. Polyester polyols may be prepared from, for example, an organic dicarboxylic acid having 2 to 12 carbon atoms, such as an aliphatic dicarboxylic acid having 4 to 6 carbon atoms, and a polyvalent alcohol, such as a diol or triol having 2 to 12 carbon atoms. Examples of the dicarboxylic acid are succinic acid, glutaric acid, adipic acid, suberic acid, azelaic acid, sebacic acid, decanedicarboxylic acid, maleic acid, fumaric acid, phthalic acid, isophthalic acid and terephthalic acid. Instead of a free dicarboxylic acid, a corresponding dicarboxylic acid derivative such as a dicarboxylic acid monoester or diester prepared by esterification with an alcohol having 1 to 4 carbon atoms or dicarboxylic anhydride can be used.

In certain embodiments, the polyol blend has a weighted average functionality of from 3 to 5, such as 3.5 to 4.5 or 3.7 to 3.9, and/or a weighted average hydroxyl number of from 300 to 500 mg KOH/g, such as 300 to 400 mg KOH/g, or 340 to 360 mg KOH/g, and/or a weighted average equivalent weight of from 150 to 250 g/mol, such as 180 to 220 g/mol, and/or a weighted average molecular weight of greater than 400 to 1000 g/mol, such as 600 to 800 g/mol or 700 to 800 g/mol.

As indicated, the isocyanate-reactive component comprises a halogenated olefin, which acts as a blowing agent. Suitable halogenated olefins include those containing 3 or 4 carbon atoms, at least one carbon-carbon double bond, and have a boiling point of −25° C. to 40° C. at 1 atm pressure. Some examples of such compounds include trans-1,1,1-trifluoro-3-chloropropene (or HCFO 1233zd(E)), cis-1,1,1,4,4,4-hexafluorobutene (or HFO 1336mzz(Z)), and trans-1,1,1,3-tetrafluoropropene (or HFO 1234ze(E)). Mixtures of these compounds may also be used. The boiling point of the halogenated olefin compound is typically at least −25° C., or at least −20° C., or at least −19° C. The boiling point of the halogenated olefin is also typically 40° C. or less, or 35° C. or less, or 33° C. or less. The halogenated olefin blowing agent may have a boiling point between any combination of these upper and lower ranges, inclusive, such as, for example, of −25° C. to 40° C., or of −20° C. to 35° C., or of −19° C. to 33° C.

In some embodiments, the halogenated olefin is utilized in an amount of at least 5% by weight, such as at least 8% by weight, or, in some cases, at least 10% by weight or at least 12% by weight, and/or no more than 20% by weight, no more than 16% by weight, such as 13% to 15% by weight, based on the total weight of the isocyanate-reactive component.

In certain embodiments, the isocyanate-reactive component is substantially or, in some cases, completely free of other halogenated blowing agents, such as CFCs, HCFCs, and/or HFCs and/or substantially or, in some cases, completely free of hydrocarbon blowing agents, such as butane, n-pentane, cyclopentane, hexane, and/or isopentane (i.e. 2-methylbutane), etc. As used herein, the term "substantially free" when used with reference to these blowing agents, means that the blowing agent is present, if at all, in an amount of less than 10% by weight, such as less than 1% by weight, based on the total weight of the halogenated olefin blowing agent.

As indicated above, the isocyanate-reactive component comprises water. In some of these embodiments, water is utilized in an amount of from 0.5 to 5.0% by weight, such as 1 to 4% by weight, or 1.0 to 3.0% by weight, or 1.0 to 2.0% by weight, based on the total weight of the isocyanate-reactive component.

The isocyanate-reactive component also comprises a surfactant. Any suitable surfactant can be used include organosilicon compounds, such as polysiloxane-polyalkyene-block copolymers, such as a polyether-modified polysiloxane. Other useful surfactants include polyethylene glycol ethers of long chain alcohols, tertiary amine or alkanolamine salts of long chain alkyl acid sulfate esters, alkylsulfonic esters, or alkylarylsulfonic acids. Such surfactants are employed in amounts sufficient to stabilize the foaming reaction mixture against collapse and the formation of large and uneven cells. In some embodiments, surfactant is utilized in an amount of 0.2 to 5.0% by weight, such as 1 to 3% by weight, based on the total weight of the isocyanate-reactive component.

The isocyanate-reactive component further comprises a tertiary amine catalyst composition. The tertiary amine catalyst composition comprises: (i) 80 to 99% by weight, such as 90 to 99% by weight, or, in some cases, 95 to 98% by weight or 97 to 98% by weight, based on the total weight of the tertiary amine catalyst composition, of a morpholine; and (ii) 1 to 20% by weight, such as 1 to 10% by weight, or, in some cases, 2 to 5% by weight or 2 to 3% by weight, based on the total weight of the tertiary amine catalyst composition, of an imidazole.

Suitable morpholine catalyst include, for example, dimorpholinodiethylether, dimorpholinodimethylether N-ethylmorpholine, and N-methylmorpholine. Suitable imidazole catalysts include, for example, imidazole, n-methylimidazole, and 1,2-dimethylimidazole. In some embodiments, the morpholine catalyst comprises a mixture of two or more morpholine catalyst, such as a mixture of dimorpholinodiethylether and N-methylmorpholine wherein, for example, the dimorpholinodiethylether is utilized in an amount of 30 to 80% by weight, such as 40 to 80% by weight and N-methylmorpholine is utilized in an amount of 20 to 70% by weight, such as 20 to 60% by weight, based on the total weight of morpholine catalyst utilized.

In certain embodiments, the tertiary amine catalyst composition does not include an acid-blocked amine catalyst. In certain embodiments, the isocyanate-reactive component does not include a metal catalyst and/or any other catalyst that is not a tertiary amine catalyst.

In certain embodiments, the total amount of tertiary amine catalyst utilized in the isocyanate-reactive component is 1 to 5% by weight, such as 1.0 to 3.0% or 1.5 to 2.5% by weight, based on the total weight of the isocyanate-reactive component.

Additional materials which may optionally be included in the foam-forming compositions of the present invention include: pigments, colorants, fillers, antioxidants, flame retardants, and stabilizers. Exemplary flame retardants useful in the foam-forming composition of the present invention include, but are not limited to, reactive bromine based compounds known to be used in polyurethane chemistry and chlorinated phosphate esters, including but not limited to, tri(2-chloroethyl)phosphate (TECP), tri(1,3-dichloro-2-propyl)phosphate, tri(1-chloro-2-propyl)phosphate (TCPP) and dimethyl propyl phosphate (DMPP).

The present specification is also directed to processes for producing rigid polyurethane foams. In such processes, an organic isocyanate is reacted with an isocyanate-reactive component of the type described above. In some embodiments, the isocyanate functional component and the isocyanate-reactive component are mixed at an isocyanate index of from 90 to 140, such as 120 to 130.

In certain embodiments, the polyol blend of the isocyanate-reactive component is reacted with an organic polyisocyanate in the presence of a blowing agent, water, a tertiary amine catalyst composition, a surfactant and any other optional ingredients. The rigid foams may be prepared by blending all of the components of the isocyanate reactive component together in a phase stable mixture, and then mixing this in the proper ratio with the organic polyisocyanate. Alternatively, one or more of the components, such as the surfactant, may be combined with the organic polyisocyanate prior to mixing it with the isocyanate reactive component. Other possible embodiments of the invention would include adding one or more of the components as a separate stream, together with the isocyanate reactive component and organic polyisocyanate.

Many foam machines are designed to condition and mix only two components in the proper ratio. For use of these machines, a premix of all the components except the polyisocyanate can be advantageously employed. According to the two-component method (component A: polyisocyanate; and component B: isocyanate-reactive component which typically includes the polyol blend, blowing agent, water, catalyst and surfactant), the components may be mixed in the proper ratio at a temperature of 5 to 50° C., such as 15 to 35° C., injected or poured into a mold having the temperature controlled to within a range of from 20 to 70° C., such as 35 to 60° C. The mixture then expands to fill the cavity with the rigid polyurethane foam. This simplifies the metering and mixing of the reacting components which form the polyurethane foam-forming mixture, but requires that the isocyanate reactive composition be phase stable.

Alternatively, the rigid polyurethane foams may also be prepared by the so-called "quasi prepolymer" method. In this method, a portion of the polyol component is reacted in the absence of the urethane-forming catalysts with the polyisocyanate component in proportion so as to provide from 10 percent to 35 percent of free isocyanate groups in the reaction product based on the prepolymer. To prepare foam, the remaining portion of the polyol is added and the components are allowed to react together in the presence of the blowing agent and other appropriate additives such as the catalysts, surfactants, water, etc. Other additives may be added to either the isocyanate prepolymer or remaining polyol or both prior to the mixing of the components, whereby at the end of the reaction, rigid polyurethane foam is provided.

Furthermore, the rigid polyurethane foam can be prepared in a batch or continuous process by the one-shot or quasi-prepolymer methods using any well-known foaming apparatus. The rigid polyurethane foam may be produced in the form of slab stock, moldings, cavity fillings, sprayed foam, frothed foam or laminates with other materials such as hardboard, plasterboard, plastics, paper or metal as facer substrates.

For closed-cell insulating foams, the object is to retain the blowing agent in the cells to maintain a low thermal conductivity of the insulating material, i.e., the rigid polyurethane foam. Thus, a high closed-cell content in the foam is desirable. Foams produced according to embodiments of the present specification have more than 80 percent, typically more than 85 percent, or more than 88 percent closed-cell content as measured according to ASTM D6226-15. Furthermore, the thermal conductivity of foams produced according to various embodiments of the present specification indicates that the foams have acceptable insulating properties, i.e., the foams have a thermal conductivity measured at 35° F. (2° C.) of less than 0.160 BTU-in/h-ft$^2$-° F. for foam from the core of 2-inch thick panels, as measured according to ASTM C518-15.

This specification also relates to the use of the rigid polyurethane foams described herein for thermal insulation. That is, the rigid polyurethane foams of the present specification may find use as an insulating material in refrigeration apparatuses since the combination of good thermal insulation and other properties described herein is particularly appropriate here. The rigid foams according to the invention can be used, for example, as an intermediate layer in composite elements or for filling hollow spaces of refrigerators and freezers, or refrigerated trailers. The inventive foams may also find use in the construction industry or for thermal insulation of long-distance heating pipes and containers.

As such, the present invention also provides a composite article comprising rigid polyurethane foam as disclosed herein sandwiched between one or more facer substrates. In certain embodiments, the facer substrate may be plastic (such a polypropylene resin reinforced with continuous bi-directional glass fibers or a fiberglass reinforced polyester copolymer), paper, wood, or metal. For example, in certain embodiments, the composite article may be a refrigeration apparatus such as a refrigerator, freezer, or cooler with an exterior metal shell and interior plastic liner. In certain embodiments, the refrigeration apparatus may be a trailer, and the composite article may include the polyurethane foams produced according to the present invention in sandwich composites for trailer floors.

It has been found, surprisingly, that the particular isocyanate-reactive components described herein are capable of producing rigid foams that have a particular combination of properties that make them suitable for use in sandwich composites for trailer floors.

First, the rigid foams can have a thermal conductivity measured at 75° F. (23.9° C.) of less than 0.160 BTU-in/h-ft$^2$-° F., for foam from the core of 3-inch thick panels, as measured according to ASTM C518-15 at a core foam density of 1.85 to 2.20 lb/ft$^3$ (29.6 to 35.2 kg/m$^3$) even when the amount of halogenated olefin blowing agent used in the isocyanate-reactive component is less than 15% by weight, based on the total weight of the isocyanate-reactive component. Second, the isocyanate-reactive component has a long shelf life. Here, when it is stated that the isocyanate-reactive component has a "long" shelf life of it means that after storing the isocyanate-reactive component for 6 days at 60° C., when the isocyanate-reactive component is combined with the polyisocyanate, the gel time of the foam produced thereby remains within 12% of the initial gel time (the gel time of such a foam if produced immediately and not after storing the isocyanate-reactive component for 6 days at 60°) even when the isocyanate-reactive component comprises 1.5% by weight or more of water. In some cases, this initial gel time is 200 seconds, ±25 seconds, which can be ideally suited for trailer floor applications. Third, the rigid foams exhibit low shrinkage, which means that the volume change of a free-rise density foam produced from the foam-forming compositions described herein is less than 4% after aging the foam for 4 weeks at ambient conditions of temperature and pressure (25° C. and 1 atm pressure). Fourth, the foams exhibit excellent adhesion to facer substrate typically used in the manufacture of composite elements for refrigerated trailer floor insulation, particularly plastic facers, specifically polypropylene resin reinforced with continuous bi-directional glass fibers and fiberglass reinforced polyester copolymer. Fifth, when foamed without a press in the production of a trailer floor part, the foams may not generate pressure during foaming so that a top floor deflection of less than 0.5 inches is maintained. As used herein, "excellent adhesion" means that the rigid foam has an average peel strength of greater than 1.0 lb-f/in according to ASTM D429: 90° peel test when adhered to such plastic facer substrates.

Various aspects of the subject matter described herein are set out in the following numbered examples:

Example 1

A rigid polyurethane foam-forming composition comprising: (a) a diisocyanate and/or polyisocyanate; and (b) an isocyanate-reactive component comprising: (1) a polyol blend comprising: (i) 60 to 98% by weight, 60 to 90% by weight, 70 to 90% by weight, or 70 to 85% by weight, based on the total weight of the polyol blend, of a saccharide-initiated polyether polyol having an OH number of from 200 to 600 mg KOH/g and a functionality of 4 to 6; (ii) 1 to 20% by weight, 5 to 20% by weight, or 5 to 15% by weight, based on the total weight of the polyol blend, of an aliphatic triol-initiated polyether polyol having an OH number of 100 to 500 mg KOH/g and a functionality of from greater than 2 to 4; and (iii) 1 to 20% by weight or 5 to 15% by weight, based on the total weight of the polyol blend, of a polyalkylene oxide glycol having a functionality of 1.9 to 2.0 and an OH number of from 40 to 225 mg KOH/g; (2) a halogenated olefin; (3) a surfactant; (4) water; and (5) a tertiary amine catalyst composition comprising 80 to 100% by weight, 80 to 99% by weight, 90 to 99% by weight, or 95 to 98% by weight, based on the total weight of the tertiary amine catalyst composition, of a morpholine.

Example 2

The rigid polyurethane-foam forming composition of Example 1, wherein the polyisocyanate comprises a methylene-bridged polyphenyl polyisocyanate and/or a prepolymer of methylene-bridged polyphenyl polyisocyanates having an average functionality of from 1.8 to 3.5, such as from 2.0 to 3.1, isocyanate moieties per molecule and an NCO content of from 25 to 32 weight percent.

Example 3

The rigid polyurethane foam-forming composition of one or more of Example 1 to Example 2, wherein: (A) the saccharide initiated polyether polyol has an OH number of from 300 to 550 mg KOH/g, 350 to 450 mg KOH/g, or 398 to 422 mg KOH/g, and/or a functionality of 4 to 6, 4 to 5, 4.0 to 4.5, or 4.2 to 4.3; and/or (B) the aliphatic triol-initiated polyether polyol has an OH number of 200 to 400 mg KOH/g, 200 to 300 mg KOH/g, 200 to 250 mg KOH/g, 230 to 250 mg KOH/g or 233 to 243 mg KOH/g, and/or a functionality of 2.5 to 3.5, or 3.0. and/or (C) the polyalkylene oxide glycol has a functionality of 1.98 to 2.00, and/or an OH number of from 56 to 112 mg KOH/g, and/or a number average molecular weight of 500 to 5000 g/mol, such as 1000 to 2000 g/mol.

Example 4

The rigid polyurethane foam-forming composition of one or more of Example 1 to Example 3, wherein the aliphatic triol-initiated polyether polyol is the reaction product of a polyvalent alcohol starter comprising or consisting of glycerin and an alkylene oxide comprising or consisting of propylene oxide.

Example 5

The rigid polyurethane foam-forming composition of one or more of Example 1 to Example 4, wherein the saccharide-initiated polyether polyol and the aliphatic triol-initiated polyether polyol are present in the polyol blend in a weight ratio of at least 3:1, 3:1 to 30:1, 5:1 to 20:1, 5:1 to 15:1, 8:1 to 12:1, 9:1 to 11:1.

Example 6

The rigid polyurethane foam-forming composition of one or more of Example 1 to Example 5, wherein the polyalkylene oxide glycols is a polypropylene oxide glycol obtained by addition polymerization of propylene oxide to propylene using a double metal cyanide catalyst (DMC catalyst).

Example 7

The rigid polyurethane foam-forming composition of one or more of Example 1 to Example 6, wherein (A) the saccharide-initiated polyether polyol and the aliphatic amine-initiated polyether polyol are present in the polyol blend in a weight ratio of at least 2:1, 3:1 to 30:1, 3:1 to 20:1, 3:1 to 10:1, 4:1 to 8:1, or 5:1 to 7:1; and/or (B) the aliphatic triol-initiated polyether polyol and the aliphatic amine-initiated polyether polyol are present in the polyol blend in a weight ratio of at least 0.3:1, 0.3:1 to 3.0:1, 0.5:1 to 2.0:1, 0.5:1 to 1.5:1, 1.0:1 to 1.5:1, or 1.0:1 to 1.2:1.

Example 8

The rigid polyurethane foam-forming composition of one or more of Example 1 to Example 7, wherein (A) the polyol blend has a weighted average functionality of from 3 to 5, 3.5 to 4.5 or 3.7 to 3.9, and/or (B) a weighted average hydroxyl number of from 300 to 500, 300 to 400, or 340 to 360, and/or (C) a weighted average equivalent weight of from 150 to 250 or 180 to 220, and/or (D) a weighted average molecular weight of greater than 400 to 1000, 600 to 800, or 700 to 800.

Example 9

The rigid polyurethane foam-forming composition of one or more of Example 1 to Example 8, wherein the halogenated olefin comprises trans-1,1,1-trifluoro-3-chloropropene.

Example 10

The rigid polyurethane foam-forming composition of one or more of Example 1 to Example 9, wherein the halogenated olefin is utilized in an amount of at least 5% by weight, at least 8% by weight, at least 10% by weight, or at least 12% by weight, and/or no more than 20% by weight, no more than 16% by weight, such as 14% to 16% by weight, based on the total weight of the isocyanate-reactive component.

Example 11

The rigid polyurethane foam-forming composition of one or more of Example 1 to Example 10, wherein the isocyanate-reactive component is substantially or, in some cases, completely free of other halogenated blowing agents, such as CFCs, HCFCs, and/or HFCs and/or substantially or, in some cases, completely free of hydrocarbon blowing agents, such as butane, n-pentane, cyclopentane, hexane, and/or isopentane (i.e. 2-methylbutane).

Example 12

The rigid polyurethane foam-forming composition of one or more of Example 1 to Example 11, wherein water is utilized in an amount of from 0.5 to 5.0% by weight, 1 to 4% by weight, 1.0 to 3.0% by weight, or 1.0 to 2.0% by weight, based on the total weight of the isocyanate-reactive component.

Example 13

The rigid polyurethane foam-forming composition of one or more of Example 1 to Example 12, wherein the morpholine comprises: (A) 30 to 80% by weight or 40 to 80% by weight, based on the total weight of the morpholine, of dimorpholinodiethylether; and (B) 20 to 70% by weight or 20 to 60% by weight, based on the total weight of the morpholine.

Example 14

The rigid polyurethane foam-forming composition of one or more of Example 1 to Example 13, wherein the tertiary amine catalyst composition comprises: (i) 80 to 99% by weight, such as 90 to 99% by weight, or, in some cases, 95 to 98% by weight or 97 to 98% by weight, based on the total weight of the tertiary amine catalyst composition, of a morpholine; and (ii) 1 to 20% by weight, such as 1 to 10% by weight, or, in some cases, 2 to 5% by weight or 2 to 3% by weight, based on the total weight of the tertiary amine catalyst composition, of an imidazole.

Example 15

A method of making a rigid polyurethane foam, comprising reacting a polyol blend with an organic polyisocyanate in the presence of a blowing agent, water, a tertiary amine catalyst composition, and a surfactant, wherein: (1) the polyol blend comprises: (i) 60 to 98% by weight, 60 to 90% by weight, 70 to 90% by weight, or 70 to 85% by weight, based on the total weight of the polyol blend, of a saccharide-initiated polyether polyol having an OH number of from 200 to 600 mg KOH/g and a functionality of 4 to 6; (ii) 1 to 20% by weight, 5 to 20% by weight, or 5 to 15% by weight, based on the total weight of the polyol blend, of an aliphatic triol-initiated polyether polyol having an OH number of 100 to 500 mg KOH/g and a functionality of from greater than 2 to 4; and (iii) 1 to 20% by weight or 5 to 15% by weight, based on the total weight of the polyol blend, of a polyalkylene oxide glycol having a functionality of 1.9 to 2.0 and an OH number of from 40 to 225 mg KOH/g; and (2) the tertiary amine catalyst composition comprising 80 to 100% by weight, 80 to 99% by weight, 90 to 99% by weight, or 95 to 98% by weight, based on the total weight of the tertiary amine catalyst composition, of a morpholine.

Example 16

The method of Example 15, wherein the polyisocyanate comprises a methylene-bridged polyphenyl polyisocyanate and/or a prepolymer of methylene-bridged polyphenyl polyisocyanates having an average functionality of from 1.8 to 3.5, such as from 2.0 to 3.1, isocyanate moieties per molecule and an NCO content of from 25 to 32 weight percent.

Example 17

The method of one or more of Example 15 to Example 16, wherein: (A) the saccharide initiated polyether polyol has an OH number of from 300 to 550 mg KOH/g, 350 to 450 mg KOH/g, or 398 to 422 mg KOH/g, and/or a functionality of 4 to 6, 4 to 5, 4.0 to 4.5, or 4.2 to 4.3; and/or (B) the aliphatic triol-initiated polyether polyol has an OH number of 200 to 400 mg KOH/g, 200 to 300 mg KOH/g, 200 to 250 mg KOH/g, 230 to 250 mg KOH/g or 233 to 243 mg KOH/g, and/or a functionality of 2.5 to 3.5, or 3.0. and/or (C) the polyalkylene oxide glycol has a functionality of 1.98 to 2.00, and/or an OH number of from 56 to 112 mg KOH/g, and/or a number average molecular weight of 500 to 5000 g/mol, such as 1000 to 2000 g/mol.

Example 18

The method of one or more of Example 15 to Example 17, wherein the aliphatic triol-initiated polyether polyol is the reaction product of a polyvalent alcohol starter comprising or consisting of glycerin and an alkylene oxide comprising or consisting of propylene oxide.

Example 19

The method of one or more of Example 15 to Example 18, wherein the saccharide-initiated polyether polyol and the aliphatic triol-initiated polyether polyol are present in the polyol blend in a weight ratio of at least 3:1, 3:1 to 30:1, 5:1 to 20:1, 5:1 to 15:1, 8:1 to 12:1, 9:1 to 11:1.

Example 20

The method of one or more of Example 15 to Example 19, wherein the polyalkylene oxide glycols is a polypropylene oxide glycol obtained by addition polymerization of propylene oxide to propylene using a double metal cyanide catalyst (DMC catalyst).

Example 21

The method of one or more of Example 15 to Example 20, wherein (A) the saccharide-initiated polyether polyol and the aliphatic amine-initiated polyether polyol are present in the polyol blend in a weight ratio of at least 2:1, 3:1 to 30:1, 3:1 to 20:1, 3:1 to 10:1, 4:1 to 8:1, or 5:1 to 7:1; and/or (B) the aliphatic triol-initiated polyether polyol and the aliphatic amine-initiated polyether polyol are present in the polyol blend in a weight ratio of at least 0.3:1, 0.3:1 to 3.0:1, 0.5:1 to 2.0:1, 0.5:1 to 1.5:1, 1.0:1 to 1.5:1, or 1.0:1 to 1.2:1.

Example 22

The method of one or more of Example 15 to Example 21, wherein (A) the polyol blend has a weighted average functionality of from 3 to 5, 3.5 to 4.5 or 3.7 to 3.9, and/or (B) a weighted average hydroxyl number of from 300 to 500, 300 to 400, or 340 to 360, and/or (C) a weighted average equivalent weight of from 150 to 250 or 180 to 220, and/or (D) a weighted average molecular weight of greater than 400 to 1000, 600 to 800, or 700 to 800.

Example 23

The method of one or more of Example 15 to Example 22, wherein the halogenated olefin comprises trans-1,1,1-trifluoro-3-chloropropene.

Example 24

The method of one or more of Example 15 to Example 23, wherein the halogenated olefin is utilized in an amount of at least 5% by weight, at least 8% by weight, at least 10% by weight, or at least 12% by weight, and/or no more than 20% by weight, no more than 16% by weight, such as 14% to 16% by weight, based on the total weight of the isocyanate-reactive component.

Example 25

The method of one or more of Example 15 to Example 24, wherein the isocyanate-reactive component is substantially or, in some cases, completely free of other halogenated blowing agents, such as CFCs, HCFCs, and/or HFCs and/or substantially or, in some cases, completely free of hydrocarbon blowing agents, such as butane, n-pentane, cyclopentane, hexane, and/or isopentane (i.e. 2-methylbutane).

Example 26

The method of one or more of Example 15 to Example 25, wherein water is utilized in an amount of from 0.5 to 5.0% by weight, 1 to 4% by weight, 1.0 to 3.0% by weight, or 1.0 to 2.0% by weight, based on the total weight of the isocyanate-reactive component.

Example 27

The method of one or more of Example 15 to Example 26, wherein the morpholine comprises: (A) 30 to 80% by weight or 40 to 80% by weight, based on the total weight of the morpholine, of dimorpholinodiethylether; and (B) 20 to 70% by weight or 20 to 60% by weight, based on the total weight of the morpholine.

Example 28

The method of one or more of Example 15 to Example 27, wherein the tertiary amine catalyst composition comprises: (i) 80 to 99% by weight, such as 90 to 99% by weight, or, in some cases, 95 to 98% by weight or 97 to 98% by weight, based on the total weight of the tertiary amine catalyst composition, of a morpholine; and (ii) 1 to 20% by weight, such as 1 to 10% by weight, or, in some cases, 2 to 5% by weight or 2 to 3% by weight, based on the total weight of the tertiary amine catalyst composition, of an imidazole.

Example 29

A composite article comprising a rigid polyurethane foam sandwiched between facer substrates, wherein the rigid polyurethane foam comprises the reaction product of: (a) a diisocyanate and/or polyisocyanate; and (b) a polyol blend comprising: (i) 60 to 98% by weight, 60 to 90% by weight, 70 to 90% by weight, or 70 to 85% by weight, based on the total weight of the polyol blend, of a saccharide-initiated polyether polyol having an OH number of from 200 to 600 mg KOH/g and a functionality of 4 to 6; (ii) 1 to 20% by weight, 5 to 20% by weight, or 5 to 15% by weight, based on the total weight of the polyol blend, of an aliphatic triol-initiated polyether polyol having an OH number of 100 to 500 mg KOH/g and a functionality of from greater than 2 to 4; and (iii) 1 to 20% by weight or 5 to 15% by weight, based on the total weight of the polyol blend, of a polyalkylene oxide glycol having a functionality of 1.9 to 2.0 and an OH number of from 40 to 225 mg KOH/g; in the presence of (c) a halogenated olefin; (d) a surfactant; (e) water; and (f) a tertiary amine catalyst composition comprising 80 to 100% by weight, 80 to 99% by weight, 90 to 99% by weight, or 95 to 98% by weight, based on the total weight of the tertiary amine catalyst composition, of a morpholine.

Example 30

The composite article of Example 29, wherein the polyisocyanate comprises a methylene-bridged polyphenyl polyisocyanate and/or a prepolymer of methylene-bridged polyphenyl polyisocyanates having an average functionality of from 1.8 to 3.5, such as from 2.0 to 3.1, isocyanate moieties per molecule and an NCO content of from 25 to 32 weight percent.

Example 31

The composite article of one or more of Example 29 to Example 30, wherein: (A) the saccharide initiated polyether polyol has an OH number of from 300 to 550 mg KOH/g, 350 to 450 mg KOH/g, or 398 to 422 mg KOH/g, and/or a functionality of 4 to 6, 4 to 5, 4.0 to 4.5, or 4.2 to 4.3; and/or (B) the aliphatic triol-initiated polyether polyol has an OH number of 200 to 400 mg KOH/g, 200 to 300 mg KOH/g, 200 to 250 mg KOH/g, 230 to 250 mg KOH/g or 233 to 243 mg KOH/g, and/or a functionality of 2.5 to 3.5, or 3.0. and/or (C) the polyalkylene oxide glycol has a functionality of 1.98 to 2.00, and/or an OH number of from 56 to 112 mg KOH/g, and/or a number average molecular weight of 500 to 5000 g/mol, such as 1000 to 2000 g/mol.

Example 32

The composite article of one or more of Example 29 to Example 31, wherein the aliphatic triol-initiated polyether polyol is the reaction product of a polyvalent alcohol starter comprising or consisting of glycerin and an alkylene oxide comprising or consisting of propylene oxide.

Example 33

The composite article of one or more of Example 29 to Example 32, wherein the saccharide-initiated polyether polyol and the aliphatic triol-initiated polyether polyol are present in the polyol blend in a weight ratio of at least 3:1, 3:1 to 30:1, 5:1 to 20:1, 5:1 to 15:1, 8:1 to 12:1, 9:1 to 11:1.

Example 34

The composite article of one or more of Example 29 to Example 33, wherein wherein the polyalkylene oxide glycols is a polypropylene oxide glycol obtained by addition polymerization of propylene oxide to propylene using a double metal cyanide catalyst (DMC catalyst).

Example 35

The composite article of one or more of Example 29 to Example 34, wherein (A) the saccharide-initiated polyether polyol and the aliphatic amine-initiated polyether polyol are present in the polyol blend in a weight ratio of at least 2:1, 3:1 to 30:1, 3:1 to 20:1, 3:1 to 10:1, 4:1 to 8:1, or 5:1 to 7:1; and/or (B) the aliphatic triol-initiated polyether polyol and the aliphatic amine-initiated polyether polyol are present in the polyol blend in a weight ratio of at least 0.3:1, 0.3:1 to 3.0:1, 0.5:1 to 2.0:1, 0.5:1 to 1.5:1, 1.0:1 to 1.5:1, or 1.0:1 to 1.2:1.

Example 36

The composite article of one or more of Example 29 to Example 35, wherein (A) the polyol blend has a weighted average functionality of from 3 to 5, 3.5 to 4.5 or 3.7 to 3.9, and/or (B) a weighted average hydroxyl number of from 300 to 500, 300 to 400, or 340 to 360, and/or (C) a weighted average equivalent weight of from 150 to 250 or 180 to 220, and/or (D) a weighted average molecular weight of greater than 400 to 1000, 600 to 800, or 700 to 800.

Example 37

The composite article of one or more of Example 29 to Example 36, wherein the halogenated olefin comprises trans-1,1,1-trifluoro-3-chloropropene.

Example 38

The composite article of one or more of Example 29 to Example 37, wherein the halogenated olefin is utilized in an amount of at least 5% by weight, at least 8% by weight, at least 10% by weight, or at least 12% by weight, and/or no more than 20% by weight, no more than 16% by weight, such as 14% to 16% by weight, based on the total weight of the isocyanate-reactive component.

Example 39

The composite article of one or more of Example 29 to Example 38, wherein the isocyanate-reactive component is substantially or, in some cases, completely free of other halogenated blowing agents, such as CFCs, HCFCs, and/or HFCs and/or substantially or, in some cases, completely free of hydrocarbon blowing agents, such as butane, n-pentane, cyclopentane, hexane, and/or isopentane (i.e. 2-methylbutane).

Example 40

The composite article of one or more of Example 29 to Example 39, wherein water is utilized in an amount of from 0.5 to 5.0% by weight, 1 to 4% by weight, 1.0 to 3.0% by weight, or 1.0 to 2.0% by weight, based on the total weight of the isocyanate-reactive component.

Example 41

The composite article of one or more of Example 29 to Example 40, wherein the morpholine comprises: (A) 30 to 80% by weight or 40 to 80% by weight, based on the total weight of the morpholine, of dimorpholinodiethylether; and (B) 20 to 70% by weight or 20 to 60% by weight, based on the total weight of the morpholine.

Example 42

The composite article of one or more of Example 29 to Example 41, wherein the facer substrates comprise a polypropylene resin reinforced with continuous bi-directional glass fibers and/or a fiberglass reinforced polyester copolymer.

Example 43

The composite article of one or more of Example 29 to Example 42, wherein the composite article is embodied in a refrigerated tractor trailer floor.

Example 44

The composite article of one or more of Example 29 to Example 43, wherein the composite article is embodied in a refrigerated tractor trailer floor.

The composite article of one or more of Example 29 to Example 44 wherein the tertiary amine catalyst composition comprises: (i) 80 to 99% by weight, such as 90 to 99% by weight, or, in some cases, 95 to 98% by weight or 97 to 98% by weight, based on the total weight of the tertiary amine catalyst composition, of a morpholine; and (ii) 1 to 20% by weight, such as 1 to 10% by weight, or, in some cases, 2 to 5% by weight or 2 to 3% by weight, based on the total weight of the tertiary amine catalyst composition, of an imidazole.

The non-limiting and non-exhaustive examples that follow are intended to further describe various non-limiting and non-exhaustive embodiments without restricting the scope of the embodiments described in this specification.

EXAMPLES

Foam-forming compositions were prepared using the ingredients and amounts (in parts by weight) set forth in Table 1. The following materials were used:

POLYOL 1: a sucrose-initiated polyether polyol having an OH number of 450-490 mg KOH/g, an average functionality of 5.5 and a viscosity of 24,000 mPa·s at 25° C.

POLYOL 2: an aromatic amine-initiated polyether polyol, hydroxyl number 378-398 mg KOH/g POLYOL 3: a sucrose-initiated PO derived polyether polyol having an OH number of 398-422 mg KOH/g, an average functionality of 4.3 and a viscosity of 2,800-4,400 mPa·s at 25° C.;

POLYOL 4: a glycerin initiated polypropylene oxide-based triol having an OH number of 233-243 mg KOH/g and a viscosity of 250 mPa·s at 25° C.;

POLYOL 5: a glycerine-initiated propylene oxide-based triol having an OH number of 445-495 mg KOH/g having a viscosity of 370-540 mPa·s at 25° C.;

POLYOL 6: an aliphatic amine-initiated propylene oxide-based polyether polyol having an OH number of 57-63, a functionality of 4, and a viscosity of 590-760 mPa·s at 25° C.; 2502-A POLYOL 7: A 4,000 molecular weight polypolyene oxide based diol, hydroxyl number 26.0-30.0

POLYOL 8: A polypropylene oxide based diol, hydroxyl number 107.4-115.4 (equivalent weight 486-522)

POLYOL 9: A 2,000 molecular weight polypropylene oxide based diol, hydroxyl number 107.4-115.4 (equivalent weight 486-522)

POLYOL 10: a diethylene glycol-phthalic anhydride-based polyester polyol having an OH number of 300-330 mg KOH/g, a functionality of 2.0, and a viscosity of 2,756 mPa·s at 25° C.;

POLYOL 11: an aromatic polyester polyol having an OH number of 230-250 mg KOH/g and a viscosity of 2,000-4,000 mPa·s at 25° C.;

SURFACTANT 1: TEGOSTAB® B-8497 from Evonik
SURFACTANT 2: TEGOSTAB® B-8499 from Evonik;
SURFACTANT 3: TEGOSTAB® B-8465 from Evonik;
SURFACTANT 4: TEGOSTAB® B-8484 from Evonik;
SURFACTANT 5: DABCO® DC-193 from Evonik;
SURFACTANT 6: NIAX™ L-5440 from Momentive;
CATALYST 1: 2,2'-dimorpholinodiethylether (JEFFCAT® DMDEE from Huntsman);
CATALYST 2: 1,2-dimethylimidazole (DABCO® 2040 or 2041 from Evonik); CATALYST 3: acid-blocked amine catalyst (POLYCAT® 204 from Air Products);
CATALYST 4: N,N-dimethylcyclohexanamine (POLYCAT® 8 from Evonik);
CATALYST 5: Bis(2-(dimethylamino)ethyl)ether/formic acid (Niax™ A-107 from Momentive);
CATALYST 6: (2-Hydroxypropyl)trimethylammonium formate (DABCO® TMR-2 from Evonik);
CATALYST 7: dimethylpiperazine (JEFFCAT® DMP from Huntsman);
CATALYST 8: N-methylmorpholine catalyst (JEFFCAT® NMM from Huntsman);
FLAME RETARDANT: Tris (2-chloroisopropyl) phosphate (Fyrol™ PCF from ICL Industrial Products);
HALOGENATED OLEFIN: trans-1-Chloro-3,3,3-trifluoropropene (Solstice® LBA from Honeywell);
ISOCYANATE: polymeric diphenylmethane diisocyanate (pMDI); NCO weight 31.5%; viscosity 200 mPa·s @ 25° C.; equivalent weight 133; functionality 2.8 (MONDUR® MR from Covestro LLC);

TABLE 1

| Ingredient | 1 | 2 | 3 | 4 | 5 | 6 | 7 |
|---|---|---|---|---|---|---|---|
| POLYOL 1 | 30.13 | 43.00 | 20.33 | — | — | 39.52 | 40.04 |
| POLYOL 2 | 33.9 | — | — | — | — | 33.60 | 34.03 |
| POLYOL 3 | — | — | 30.50 | 61.74 | 36.88 | — | — |
| POLYOL 4 | — | — | — | 9.00 | 31.32 | 6.97 | 7.08 |
| POLYOL 5 | — | 32.32 | 19.17 | — | — | — | — |
| POLYOL 6 | — | — | 5.00 | 5.00 | 6.55 | — | — |
| POLYOL 11 | 11.29 | — | — | — | — | — | — |
| SURFACTANT 1 | 1.90 | — | — | — | — | — | — |
| SURFACTANT 2 | — | — | — | 2.00 | 1.95 | — | — |
| SURFACTANT 3 | — | 1.90 | 1.90 | — | — | 2.04 | 2.05 |
| CATALYST 1 | 0.73 | 0.73 | 1.00 | 0.95 | 1.50 | 0.45 | — |
| CATALYST 2 | 0.15 | 0.15 | 0.20 | 0.30 | 0.20 | 0.40 | 0.20 |
| CATALYST 5 | — | — | — | — | — | — | 0.20 |
| FLAME RETARDANT | 5.00 | 5.00 | 5.00 | 5.00 | 5.00 | 4.98 | 5.00 |
| Water | 1.90 | 1.90 | 1.90 | 2.01 | 1.60 | 2.79 | 2.70 |
| HALOGENATED OLEFIN | 15.00 | 15.00 | 15.00 | 14.00 | 15.00 | 9.26 | 8.70 |
| Total | 100.00 | 100.00 | 100.00 | 100.00 | 100.00 | 100.01 | 100.00 |
| ISOCYANATE | 115.00 | 121.00 | 120.00 | 114.00 | 100.00 | 119.00 | 120.00 |
| NCO:OH Index | 115 | 107 | 111 | 118 | 127 | 120 | 120 |

| Ingredient | 8 | 9 | 10 | 11 | 12 | 13 |
|---|---|---|---|---|---|---|
| POLYOL 7 | — | — | — | — | — | 11.81 |
| POLYOL 3 | 39.83 | 45.31 | 41.24 | 41.20 | 41.36 | 39.10 |
| POLYOL 4 | 33.83 | 38.47 | 35.03 | 35.00 | 35.14 | 33.22 |
| POLYOL 6 | 12.03 | — | — | — | — | — |
| SURFACTANT 3 | 2.07 | — | — | — | — | 2.20 |
| SURFACTANT 4 | — | — | 2.19 | 2.19 | 2.20 | — |
| SURFACTANT 5 | — | 2.19 | — | — | — | — |
| CATALYST 2 | 0.15 | — | 0.80 | — | — | 0.20 |
| CATALYST 3 | — | 1.00 | — | 1.15 | — | — |
| CATALYST 4 | — | — | — | — | 0.50 | — |
| CATALYST 5 | 0.17 | — | — | — | — | 0.17 |
| CATALYST 6 | 0.20 | — | — | — | — | — |
| FLAME RETARDANT | — | — | 7.98 | 7.97 | 8.00 | — |
| Water | 2.83 | 2.49 | 2.39 | 2.14 | 2.40 | 2.80 |
| HALOGENATED OLEFIN | 8.89 | 10.55 | 10.37 | 10.36 | 10.40 | 10.50 |
| Total | 100.00 | 100.01 | 100.00 | 100.01 | 100.00 | 100.00 |
| ISOCYANATE | 121.00 | 135.00 | 121.00 | 122.00 | 120.00 | 120.00 |
| NCO:OH Index | 118 | 125 | 125 | 125 | 125 | 120 |

| Ingredient | 14 | 15 | 16 | 17 | 18 | 19 | 20 |
|---|---|---|---|---|---|---|---|
| POLYOL 3 | 52.37 | 53.10 | 52.69 | 39.15 | 61.00 | 61.28 | 61.49 |
| POLYOL 4 | 10.04 | 10.00 | 10.10 | 23.15 | 9.00 | 9.00 | 9.01 |
| POLYOL 6 | — | — | — | — | 5.00 | 5.00 | 5.00 |
| POLYOL 8 | — | 9.00 | 9.06 | 9.00 | — | — | — |
| POLYOL 9 | 9.02 | — | — | — | — | — | — |
| SURFACTANT 2 | 1.91 | 1.9 | 1.9 | — | 2.00 | 2.00 | 2.00 |
| SURFACTANT 3 | — | — | — | 1.90 | — | — | — |
| CATALYST 1 | 2.01 | 1.30 | 0.90 | 0.9 | 1.00 | 1.00 | 1.00 |
| CATALYST 2 | — | 0.05 | 0.05 | — | 0.20 | 0.20 | 0.30 |
| CATALYST 8 | 0.38 | 0.45 | 1.10 | 1.35 | — | — | — |

TABLE 1-continued

| | | | | | | | |
|---|---|---|---|---|---|---|---|
| FLAME RETARDANT | 8.04 | 8.00 | 8 | 8.00 | 5.00 | 5.00 | 5.00 |
| Water | 2.41 | 1.60 | 1.60 | 1.85 | 1.80 | 1.89 | 2.20 |
| HALOGENATED OLEFIN | 13.82 | 14.60 | 14.60 | 14.70 | 15.00 | 14.63 | 14.00 |
| Total | 100.00 | 100.00 | 100.00 | 100.00 | 100.00 | 100.00 | 100.00 |
| ISOCYANATE | 118.00 | 103.50 | 103.00 | 100.00 | 110.00 | 112.00 | 118.00 |
| NCO:OH Index | 125 | 123 | 123 | 123 | 119 | 119 | 119 |

| Ingredient | 21 | 22 | 23 | 24 | 25 | 26 | 27 |
|---|---|---|---|---|---|---|---|
| POLYOL 3 | 61.80 | 49.00 | 49.00 | 55.19 | 55.90 | 53.12 | 39.19 |
| POLYOL 4 | 9.00 | 9.00 | 9.00 | 10.00 | 10.00 | 10.00 | 23.30 |
| POLYOL 6 | 5.00 | 5.00 | 5.00 | — | — | 9.00 | — |
| POLYOL 8 | — | — | — | — | 10.00 | — | 10.00 |
| POLYOL 10 | — | 12.00 | 12.00 | 10.00 | — | — | — |
| SURFACTANT 2 | 2.00 | 2.00 | 2.00 | 1.91 | 1.90 | 1.90 | — |
| SURFACTANT 3 | — | — | — | — | — | — | 1.90 |
| CATALYST 1 | 0.95 | 1.00 | 1.00 | 0.90 | 0.70 | 1.49 | 0.88 |
| CATALYST 2 | 0.30 | 0.20 | 0.20 | 0.20 | 0.20 | 0.05 | — |
| LACTIC ACID | — | — | 2.00 | — | — | — | — |
| CATALYST 7 | — | — | — | — | — | — | 0.38 |
| CATALYST 8 | — | — | — | — | — | 0.24 | — |
| FLAME RETARDANT | 5.00 | 5.00 | 5.00 | 5.00 | 5.00 | 8.00 | 8.00 |
| Water | 2.05 | 1.80 | 1.80 | 1.80 | 1.80 | 1.60 | 1.86 |
| HALOGENATED OLEFIN | 13.90 | 15.00 | 15.00 | 15.00 | 14.50 | 14.60 | 15.00 |
| Total | 100.00 | 100.00 | 102.00 | 100.00 | 100.00 | 100.00 | 100.51 |
| ISOCYANATE | 115.00 | 110.00 | 110.00 | 113.00 | 107.00 | 105.00 | 100.00 |
| NCO:OH Index | 119 | 123 | 123 | 120 | 119 | 125 | 122 |

| Ingredient | 28 | 29 | 30 | 31 |
|---|---|---|---|---|
| POLYOL 3 | 39.09 | 39.71 | 39.72 | 39.67 |
| POLYOL 4 | 33.20 | 33.76 | 33.76 | 33.69 |
| POLYOL 6 | 6.64 | 7.03 | 7.03 | 11.97 |
| SURFACTANT 6 | — | 2.04 | 2.04 | — |
| SURFACTANT 4 | 1.94 | — | — | — |
| SURFACTANT 3 | — | — | — | 2.2 |
| CATALYST 2 | — | 0.20 | 0.20 | 0.20 |
| CATALYST 5 | — | 0.20 | 0.20 | 0.17 |
| CATALYST 4 | 0.48 | — | — | — |
| FLAME RETARDANT | 4.74 | 5.00 | 4.99 | — |
| Water | 2.31 | 2.79 | 2.79 | 2.80 |
| HALOGENATED OLEFIN | 11.60 | 9.27 | 9.27 | 9.30 |
| Total | 100.00 | 100.00 | 100.00 | 100.00 |
| ISOCYANATE | 110.00 | 119.00 | 119.00 | 122.00 |
| NCO:OH Index | 119 | 118 | 118 | 120 |

For each of the Examples, the polyols, catalysts, surfactants, processing additive (if any), flame retardant (if any), water, and halogenated olefin were combined in the amounts indicated in Table 1. All foams were prepared in a laboratory using a small scale laboratory press. Successful laboratory results were prepared using a Hennecke HK-100 high-pressure foam machine. The liquid output was maintained at a constant 21° C. for Polyol side and 27° C. for Isocyanate side with an output range of 454 to 653 grams/second with a pour pressure of 103 bar. The minimum fill density was determined from foaming 3 panels poured into a temperature controlled mold (29.4° C.) having dimensions—8 inches by 78.75 inches by 3 inches (20.3 cm×200 cm×7.6 cm) that didn't fill the mold entirely, then linear regression was used to determine a calculated minimum panel mass value. After the minimum fill density was determined, then foam was packed to obtain desired density of approximate 8 to 15 percent over the minimum fill density. The foam was sandwiched between one aluminum facer and one plastic facer. Foams were held in the mold at 29.4° C. for 180 to 240 minutes before de-molding. Overall density for each of the foams was between 2.12 and 2.65 lb/ft$^3$ (34.0 to 42.4 kg/m$^3$), measured according to ASTM D1622.

The foams were tested for various properties and the results are set forth in Table 2. For k-factor, the foam was considered a "Pass" if it had a thermal conductivity measured at 75° F. (23.9° C.) of less than 0.160 BTU-in/h-ft$^2$-° F., for foam from the core of 3-inch thick panels, as measured according to ASTM C518-17. For shelf life, the foam was considered a "Pass" if the gel time of the foam after storing the isocyanate-reactive component for 6 days at 60° C. was within 12% of the initial gel time (the gel time of such a foam if produced immediately and not after storing the isocyanate-reactive component for 6 days at 60° C.). For dimensional stability, the foam was considered a "Pass" if the volume change of a free-rise density foam was less than 4% after aging the foam for 4 weeks at ambient conditions of temperature and pressure (25° C. and 1 atm pressure). For foam pressure, the foam was considered a "Pass" if the pressure generated was less than 60 hPa) as measured in a cylindrical, vertical flow tube approximately 59 inches tall by 4 inches wide, with a pressure indicator approximately 7" above the base. For adhesion, the foam was considered a "Pass" if it had an average peel strength of at least 1.0 lb-f/in according to ASTM D429: 90° peel test when adhered to a plastic substrate that was a polypropylene resin reinforced with continuous bi-directional glass fibers.

TABLE 2

| Example | k-Factor | Shelf-life | Dimensional Stability | Foam Pressure | Adhesion |
|---|---|---|---|---|---|
| 1 | Not Tested | Not Tested | Fail | Not Tested | Not Tested |
| 2 | Not Tested | Not Tested | Fail | Not Tested | Not Tested |
| 3 | Not Tested | Not Tested | Fail | Not Tested | Not Tested |
| 4 | Pass | Pass | Fail | Fail | Not Tested |
| 5 | Fail | Not Tested | Fail | Not Tested | Not Tested |
| 6 | Fail | Not Tested | Fail | Not Tested | Not Tested |
| 7 | Fail | Not Tested | Fail | Not Tested | Not Tested |
| 8 | Fail | Not Tested | Fail | Fail | Pass |
| 9 | Not Tested | Not Tested | Fail | Not Tested | Not Tested |
| 10 | Not Tested | Not Tested | Fail | Not Tested | Not Tested |
| 11 | Not Tested | Not Tested | Fail | Not Tested | Not Tested |
| 12 | Not Tested | Not Tested | Fail | Not Tested | Not Tested |
| 13 | Not Tested | Not Tested | Pass | Fail | Pass |
| 14 | Pass | Pass | Pass | Pass | Pass |
| 15 | Pass | Pass | Pass | Pass | Pass |
| 16 | Pass | Pass | Pass | Pass | Pass |
| 17 | Fail | Pass | Fail | Not Tested | Pass |
| 18 | Pass | Pass | Pass | Fail | Fail |
| 19 | Pass | Pass | Pass | Not Tested | Not Tested* |
| 20 | Pass | Pass | Pass | Not Tested | Not Tested* |
| 21 | Pass | Pass | Not Tested | Fail | Not Tested* |
| 22 | Pass | Pass | Fail | Fail | Pass |
| 23 | Pass | Pass | Fail | Fail | Not Tested |
| 24 | Pass | Pass | Fail | Fail | Not Tested |
| 25 | Pass | Pass | Not Tested | Fail | Pass |
| 26 | Not Tested | Fail | Not Tested | Pass | Not Tested |
| 27 | Not Tested | Fail | Not Tested | Not Tested | Not Tested |
| 28 | Not Tested | Fail | Not Tested | Not Tested | Not Tested |
| 29 | Not Tested | Not Tested | Not Tested | Fail | Not Tested |
| 30 | Fail | Fail | Pass | Fail | Not Tested |
| 31 | Not Tested | Fail | Not Tested | Not Tested | Not Tested |

*Foam surface exhibited "ant tunnel" appearance on the surface, which was indicative of poor adhesion and other foam surface problems.

As is apparent from Table 2, only Examples 14-16 passed all 5 tests set forth in Table 2. Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A rigid polyurethane foam-forming composition comprising:
   (a) a diisocyanate and/or polyisocyanate; and
   (b) an isocyanate-reactive component comprising:
      (1) a polyol blend comprising:
         (i) 60 to 98% by weight, based on the total weight of the polyol blend, of a saccharide-initiated polyether polyol having an OH number of from 200 to 600 mg KOH/g and a functionality of 4 to 6;
         (ii) 1 to 20% by weight, based on the total weight of the polyol blend, of an aliphatic triol-initiated polyether polyol having an OH number of 100 to 500 mg KOH/g and a functionality of from greater than 2 to 4; and
         (iii) 1 to 20% by weight, based on the total weight of the polyol blend, of a polyalkylene oxide glycol having a functionality of 1.9 to 2.0 and an OH number of from 40 to 225 mg KOH/g;
      (2) a halogenated olefin;
      (3) a surfactant;
      (4) water; and
      (5) a tertiary amine catalyst composition comprising:
         (i) 80 to 99% by weight, based on the total weight of the tertiary amine catalyst composition, of a morpholine; and
         (ii) 1 to 20% by weight, based on the total weight of the tertiary amine catalyst composition, of an imidazole.

2. The rigid polyurethane foam-forming composition of claim 1, wherein:
   (A) the saccharide initiated polyether polyol has an OH number of from 300 to 550 mg KOH/g and a functionality of 4.0 to 4.5;
   (B) the aliphatic triol-initiated polyether polyol has an OH number of 200 to 250 mg KOH/g and a functionality of 2.5 to 3.5; and
   (C) the aliphatic amine-initiated polyether polyol has an OH number of from 50 to 70 mg KOH/g and a functionality of 3.5 to 4.5.

3. The rigid polyurethane foam-forming composition of claim 1, wherein the saccharide-initiated polyether polyol and the aliphatic triol-initiated polyether polyol are present in the polyol blend in a weight ratio of 3:1 to 30:1.

4. The rigid polyurethane foam-forming composition of claim 1, wherein the saccharide-initiated polyether polyol and the aliphatic triol-initiated polyether polyol are present in the polyol blend in a weight ratio of 5:1 to 15:1.

5. The rigid polyurethane foam-forming composition of claim 1, wherein:
   (A) the saccharide-initiated polyether polyol and the aliphatic amine-initiated polyether polyol are present in the polyol blend in a weight ratio of 5:1 to 20:1; and
   (B) the aliphatic triol-initiated polyether polyol and the aliphatic amine-initiated polyether polyol are present in the polyol blend in a weight ratio of at least 0.3:1.

6. The rigid polyurethane foam-forming composition of claim 1, wherein:
   (A) the saccharide-initiated polyether polyol and the aliphatic amine-initiated polyether polyol are present in the polyol blend in a weight ratio of 5:1 to 15:1; and
   (B) the aliphatic triol-initiated polyether polyol and the aliphatic amine-initiated polyether polyol are present in the polyol blend in a weight ratio of 0.5:1 to 1.5:1.

7. The rigid polyurethane foam-forming composition of claim 1, wherein the halogenated olefin comprises trans-1, 1,1-trifluoro-3-chloropropene.

8. The rigid polyurethane foam-forming composition of claim 1, wherein the morpholine comprises:
   (A) 40 to 80% by weight, based on the total weight of the morpholine, of dimorpholinodiethylether; and
   (B) 20 to 60% by weight, based on the total weight of the morpholine.

9. A method of making a rigid polyurethane foam, comprising reacting a polyol blend with an organic polyisocyanate in the presence of a halogenated olefin, water, a tertiary amine catalyst composition, and a surfactant, wherein:
(1) the polyol blend comprises:
  (i) 60 to 98% by weight, based on the total weight of the polyol blend, of a saccharide-initiated polyether polyol having an OH number of from 200 to 600 mg KOH/g and a functionality of 4 to 6;
  (ii) 1 to 20% by weight, based on the total weight of the polyol blend, of an aliphatic triol-initiated polyether polyol having an OH number of 100 to 500 mg KOH/g and a functionality of from greater than 2 to 4; and
  (iii) 1 to 20% by weight, based on the total weight of the polyol blend, of a polyalkylene oxide glycol having a functionality of 1.9 to 2.0 and an OH number of from 40 to 225 mg KOH/g; and
(2) the tertiary amine catalyst composition comprises:
  (i) 80 to 99% by weight, based on the total weight of the tertiary amine catalyst composition, of a morpholine; and
  (ii) 1 to 20% by weight, based on the total weight of the tertiary amine catalyst composition, of an imidazole.

10. The method of claim 9, wherein:
(A) the saccharide initiated polyether polyol has an OH number of from 300 to 550 mg KOH/g and a functionality of 4.0 to 4.5;
(B) the aliphatic triol-initiated polyether polyol has an OH number of 200 to 250 mg KOH/g and a functionality of 2.5 to 3.5; and
(C) the aliphatic amine-initiated polyether polyol has an OH number of from 50 to 70 mg KOH/g and a functionality of 3.5 to 4.5.

11. The method of claim 9, wherein the saccharide-initiated polyether polyol and the aliphatic triol-initiated polyether polyol are present in the polyol blend in a weight ratio of 3:1 to 30:1.

12. The method of claim 9, wherein the saccharide-initiated polyether polyol and the aliphatic triol-initiated polyether polyol are present in the polyol blend in a weight ratio of 5:1 to 15:1.

13. The method of claim 9, wherein:
(A) the saccharide-initiated polyether polyol and the aliphatic amine-initiated polyether polyol are present in the polyol blend in a weight ratio of 5:1 to 20:1; and
(B) the aliphatic triol-initiated polyether polyol and the aliphatic amine-initiated polyether polyol are present in the polyol blend in a weight ratio of at least 0.3:1.

14. The method of claim 9, wherein:
(A) the saccharide-initiated polyether polyol and the aliphatic amine-initiated polyether polyol are present in the polyol blend in a weight ratio of 5:1 to 15:1; and
(B) the aliphatic triol-initiated polyether polyol and the aliphatic amine-initiated polyether polyol are present in the polyol blend in a weight ratio of 0.5:1 to 1.5:1.

15. The method of claim 9, wherein the halogenated olefin comprises trans-1,1,1-trifluoro-3-chloropropene.

16. The method of claim 9, wherein the morpholine comprises:
(A) 40 to 80% by weight, based on the total weight of the morpholine, of dimorpholinodiethylether; and
(B) 20 to 60% by weight, based on the total weight of the morpholine.

17. A composite article comprising a rigid polyurethane foam sandwiched between facer substrates, wherein the rigid polyurethane foam comprises the reaction product of:
(a) a diisocyanate and/or polyisocyanate; and
(b) a polyol blend comprising:
  (i) 60 to 98% by weight, based on the total weight of the polyol blend, of a saccharide-initiated polyether polyol having an OH number of from 200 to 600 mg KOH/g and a functionality of 4 to 6;
  (ii) 1 to 20% by weight, based on the total weight of the polyol blend, of an aliphatic triol-initiated polyether polyol having an OH number of 100 to 500 mg KOH/g and a functionality of from greater than 2 to 4; and
  (iii) 1 to 20% by weight, based on the total weight of the polyol blend, of a polyalkylene oxide glycol having a functionality of 1.9 to 2.0 and an OH number of from 40 to 225 mg KOH/g;
in the presence of
(c) a halogenated olefin;
(d) a surfactant;
(e) water; and
(f) a tertiary amine catalyst composition comprising:
  (i) 80 to 99% by weight, based on the total weight of the tertiary amine catalyst composition, of a morpholine; and
  (ii) 1 to 20% by weight, based on the total weight of the tertiary amine catalyst composition, of an imidazole.

18. The composite article of claim 17 wherein the facer substrates comprise a polypropylene resin reinforced with continuous bi-directional glass fibers and/or a fiberglass reinforced polyester copolymer.

19. The composite article of claim 17, wherein the composite article is embodied in a refrigerated tractor trailer floor.

* * * * *